United States Patent

[11] 3,593,188

| [72] | Inventor | Thomas A. Nussmeier |
| | | Thousand Oaks, Calif. |
| [21] | Appl. No. | 738,263 |
| [22] | Filed | June 19, 1968 |
| [45] | Patented | July 13, 1971 |
| [73] | Assignee | Hughes Aircraft Company |
| | | Culver City, Calif. |

[54] INTERNALLY MODULATED LASER
5 Claims, 9 Drawing Figs.
[52] U.S. Cl. ............................................. 331/94.5, 332/7.51
[51] Int. Cl. ............................................. H01s 3/12
[50] Field of Search ............................................. 332/7.51; 331/94.5

[56] References Cited
UNITED STATES PATENTS
3,315,177  4/1967  Benson ........................ 331/94.5
3,392,353  7/1968  Miller ........................... 332/7.51
3,405,370  10/1968  Kaminow .................... 332/7.51 X
FOREIGN PATENTS
1,096,167  12/1967  Great Britain ............... 331/94.5

Primary Examiner—Rodney D. Bennett, Jr.
Assistant Examiner—Daniel C. Kaufman
Attorneys—James K. Haskell and John Holtrichter, Jr.

ABSTRACT: A laser beam is modulated by an internal modulator, which incorporates in a single element a polarizer and a retardation modulator. A modulating signal is applied across electrodes on the modulator as a variable electric field having a direction that is orthogonal to a direction of preferred polarization. The modulator is comprised of electro-optic material having a flat window surface and is placed in the regenerative path within the laser and positioned such that the normal of the window surface is at the Brewster angle with respect to the regenerative path passing through this surface. The orientation of the surface about the active axis determines the type of modulation present.

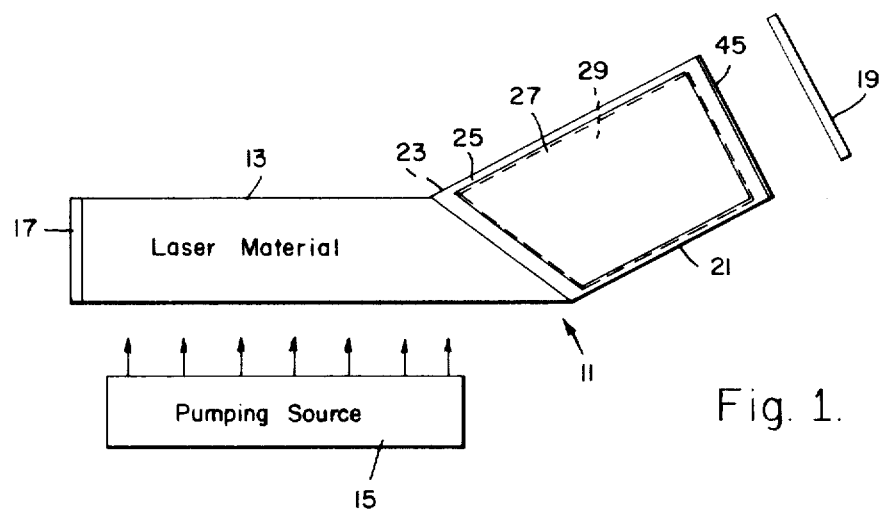
Fig. 1.
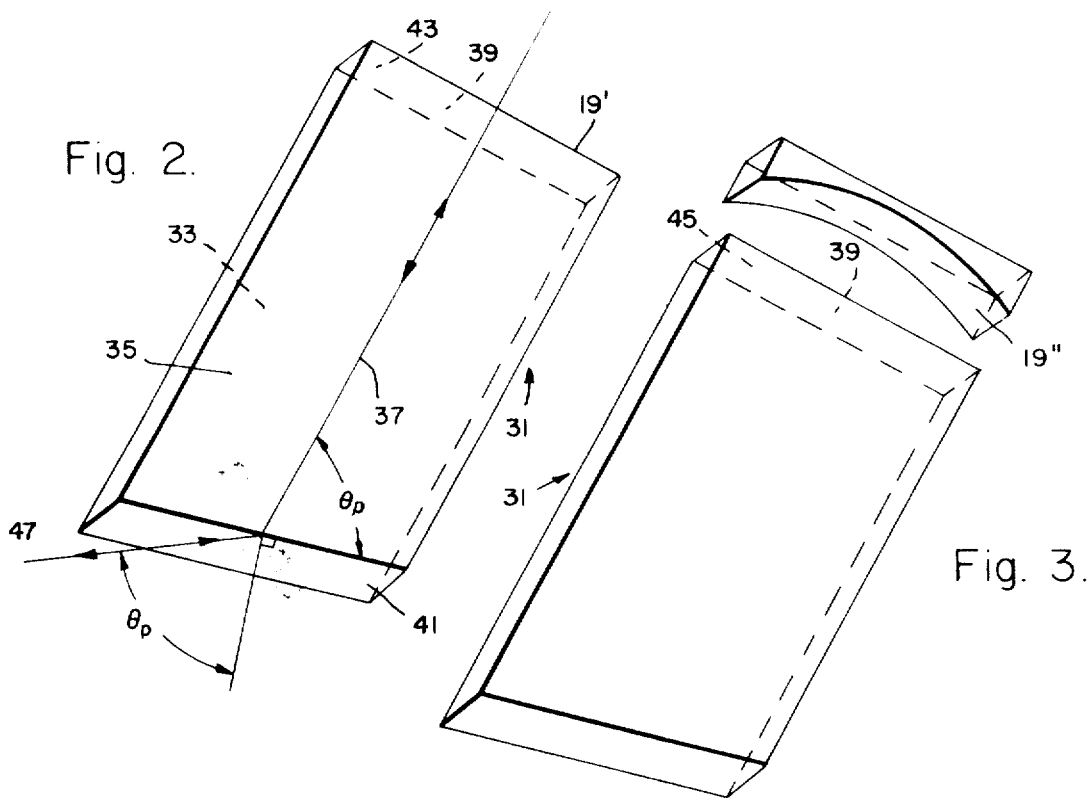
Fig. 2.
Fig. 3.
Thomas A. Nussmeier,
INVENTOR.
BY
ATTORNEY.

Thomas A. Nussmeier,
INVENTOR.
BY.
ATTORNEY

Thomas A. Nussmeier,
INVENTOR.

INTERNALLY MODULATED LASER

Modulation of a laser beam has been accomplished both internally and externally of the laser regenerative cavity. External modulation devices consist of elements arranged in sequence such as a polarizer, an electro-optic crystal with electrode plates for the application of an electric field, a static waveplate, and another polarizer. Together, these elements constitute an inefficient use of the laser's output power. However, the advantage in using external modulators is that there is no internal insertion loss as there is in using internal modulators, which loss decreases the gain of the laser during the regenerative cycle that can stop or prevent laser action. What would be desirable then is a modulating device which is compact and uses efficiently the laser's output power and which does not interfere with the gain of the laser. These requirements can be met if the insertion loss of an internal modulator is minimized.

In the past, at least two devices were necessary to modulate a laser beam internally; a retardation modulator and a polarizer. Since each element inside a laser cavity constitutes an undesirable loss in a critical area, it is beneficial to reduce the number of elements in the cavity. If high-gain lasing material such as He-Ne is used, these losses are usually not critical, but if low-gain lasing material such as $CO_2$ is used, then there losses must be minimized in order that laser action can be obtained.

For internal modulation of low-gain lasing material such as $CO_2$, it has been difficult to overcome the insertion loss problem. However, the advantages of internal modulation, namely: (1) a wider choice of the type of modulation and (2) a more compact device, make it desirable that such a system be made applicable to low-gain lasers as well as those having higher gain. An internal modulator having a polarizer and a separate retardation modulator, whose surfaces are coated with antireflection coatings, has been used in prior art $CO_2$ lasers, but since losses still occur at each surface of all elements and the gain is so very critical, the application is limited.

As a general rule, the polarizers used in the prior art were either of the Brewster window type or comprised a wafer of polarizing material. The retardation modulator consisted of an electro-optical crystal that is transparent at the wavelength of the laser energy to be modulated and is provided with electrodes on opposite surfaces thereof for connection to a modulation source.

Contrary to the prior art technique above described, the present invention unites the polarizer and the retardation modulator into one element. This allows for fewer elements contributing to cavity loss and reduces alignment problems between these elements and further provides for the ability to readily internally modulate a low-gain laser.

There are two basic applications of the invention which provide alternate methods of modulation, the first of which provides a frequency modulation (FM) modulator and the second provides an amplitude modulation (AM) modulator. Simply stated, for the FM operation, one of the axes of induced birefringence created by an applied electric field in the modulator element, as will be more fully explained later, is aligned with a preferred direction of polarization of laser energy propagating in the modulator. This preferred direction of polarization is determined by a Brewster window surface fabricated in the modulator element which reflects all other polarizations substantially eliminating all but the preferred direction of polarization.

A modulated signal voltage is applied to the electrodes to induce an electric field in the modulator element and, as the voltage increases, the refractive index of the axis aligned with the direction of preferred polarization monotonically increases or decreases. Since the cavity length of a laser depends on the cavity's length in air space plus the length of the crystal times its refractive index, then the change in cavity length depends on the change in the refractive index times the crystal length. Because the change in cavity length is a function of voltage, it follows that the change in frequency $\Delta f$ is a function of voltage $V$, as shown by the equation $$\Delta f = \Delta f(U).$$

For the AM operation, the axes of induced birefringence are placed 45° out of alignment with the preferred direction of polarization. This off-alignment causes a repolarization effect which produces an orthogonal component to the direction of polarization. This AM component is reflected at the Brewster window and is thereby propagated out of the crystal. The change in intensity $\Delta A$ of this direction of polarization is related to the change in voltage $V$, as shown by the equation $$\Delta A = \Delta A(U).$$

It is therefore an object of the present invention to provide an improved low-loss internal modulator which can be advantageously used in low-gain lasers.

It is another object of the invention to provide a low-loss internal modulator that can be used for high-gain lasers in order to have higher output efficiency.

It is still another object of the invention to provide an internal laser modulator that simplifies or eliminates alignment problems.

It is yet another object of this invention to provide a method for fabricating internal modulators used in internally modulated lasers.

Other objects and many of the attendant advantages of this invention will be more readily appreciated as the same becomes better understood by reference to the following detailed description and considered in connection with the accompanying drawings in which like reference symbols designate like parts throughout the figures thereof and wherein:

FIG. 1 is a schematic drawing of one embodiment of the invention which provides frequency modulation of the output laser beam;

FIG. 2 is a perspective drawing of the internal modulator element of the device shown in FIG. 1, where one of the resonant cavity mirrors is attached to a surface of the modulator element;

FIG. 3 is similar to the internal modulator shown in FIG. 2 except that the flat resonant cavity mirror is replaced by a spherical mirror surface spaced from the surface of the modulator element;

Figure 4:
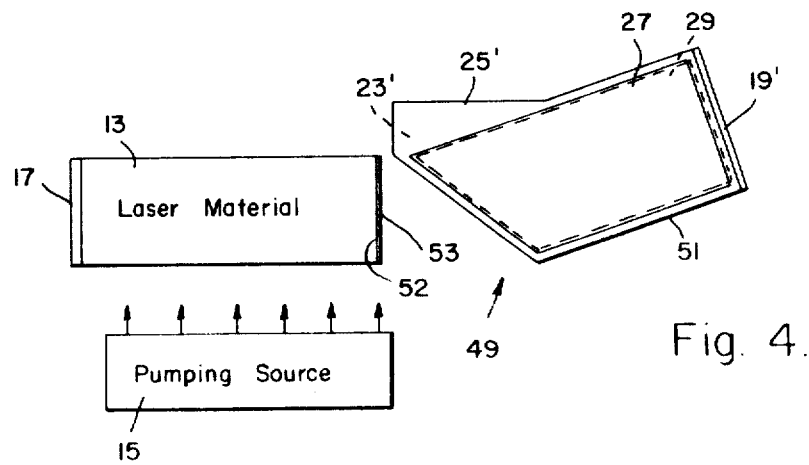
FIG. 4 is a schematic drawing of another embodiment of the invention which provides amplitude modulation of the laser output beam.

The electro-optic effect commonly referred to as induced birefringence allows electro-optic materials to be used for modulating devices in lasers. It is highly desirable to find an active axis for these materials such that the axis in the absence of an electric field has an index of refraction independent of the direction polarization of the laser beam propagating parallel to this axis; and such that in the presence of an electric field of a particular direction dependent upon the class of material, the index of refraction is changed equally and oppositely for two orthogonal directions of polarization of the laser beam propagating along the active axis. The directions of the induced equal and opposite changes in the index of refraction are commonly referred to as the axes of induced birefringence or as the induced fast and slow axes of refraction. When natural birefringence exist, there are well known techniques available to cancel its effect.

Induced birefringence may be more fully understood by referring to an article in the Journal of the Optical Society of America, Vol. 51, No. 1, Jan. 1961, on pages 76—79, entitled "Electro-Optical Effect of Zincblende" by Susumu Namba.

Gallium arsenide (GaAs) is the most frequently used material for internal modulation of a $CO_2$ laser. Others included in the same class of materials include zinc-telluride, zinc-sulfide, and cuprous-chloride. These materials meet the requirements stated above.

With reference to FIG. 1, there is shown an apparatus for frequency modulation of a laser. An internally frequency modulated laser 11 generally comprises an active material 13 pumped by a pumping source 15 and placed between a pair of optically reflecting surfaces 17 and 19 which form the ends of a resonant cavity. Also positioned within the resonant cavity is an FM modulating device 21 having opposite parallel surfaces 23 and 25. Electrode plates 27 and 29 are disposed on these surfaces and coupled to a modulating signal from a source (not how).

The active material 13 may comprise any known substance which exhibit lasing action to provide coherent light along the regenerative path provided between the reflecting surfaces making up the resonant cavity. This active material may comprise a solid, e.g. a ruby crystal; a liquid; or a gas, e.g. a helium-neon gas mixture or $CO_2$.

The pumping source 15 may comprise any source of energy which is capable of exciting the molecules or ions in the active material 13 to a lasing state and need not be an optical pump source as indicated in the drawing but can be any other type of pump source suitable for exciting the particular laser material used. In other words, the pumping source 15 is a source of energy which is capable of establishing the necessary inverted population density condition in the active material 13. Examples of such pumping sources are means for providing a radio frequency field, a xenon flash tube or any other suitable type of energy source.

With reference to FIG. 2, an FM modulating device 31, similar to the device 21 in FIG. 1, is shown in a perspective view. The device comprises a crystal of electro-optic material that is transparent to wavelength of the laser energy and has two opposite sides 33 and 35 that are parallel to an active axis of the crystal generally shown as line 37, while a flat end surface 39 is orthogonal to the active axis 37. A Brewster window 41, at the opposite end of the device 31 from the end surface 39, is cut at an angle of $\theta_p$ (to be described later) with respect to the active axis 37. Both surfaces 39 and 41 may preferably be polished optically flat and the surface 39 is coated with a reflecting coating 43 (attached mirror configuration) that constitutes a reflector 19'. In an embodiment having a spaced reflector 19 or 19'' (see FIGS. 1 and 3), the surface 39 may be coated with an antireflection coating 45. The device 31 is aligned such that a laser beam 47 from the laser 11 is incident upon the surface 41 at the angle of $\theta_p$.

In order for an FM modulated laser beam to leave the laser cavity, either reflecting surface 17 or 19 must be partially transparent or another means such as a beam splitter must be introduced in the laser beam path to deflect a portion of the laser energy.

An internal amplitude modulated laser 49 shown in FIG. 4 includes the same elements as those shown in FIG. 1 with the exception that an AM modulating device 51 is substituted for the FM modulating device 21 and that laser material 13 is spaced apart from device 51 and its end 52 coated with an antireflection coating 53.

Figure 5:
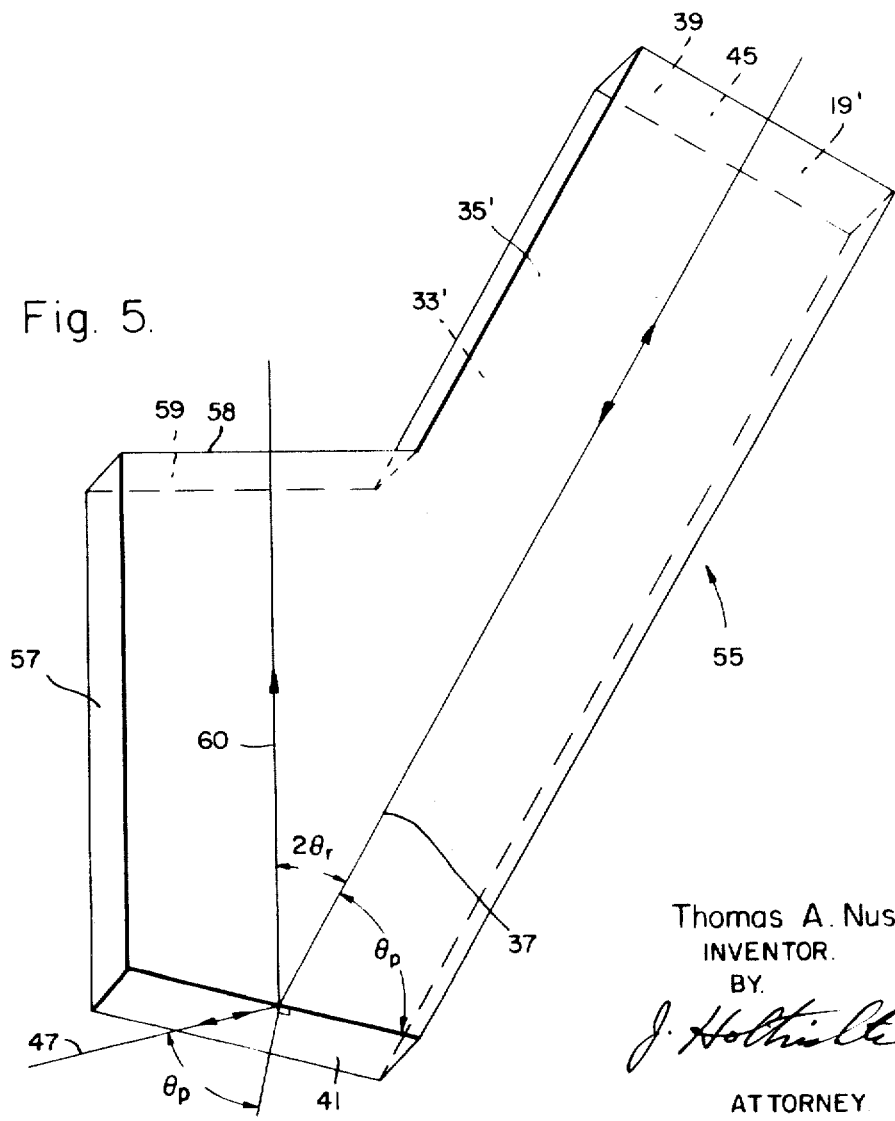
FIG. 5 is a perspective drawing of the internal modulator element as seen in FIG. 4.

FIG. 5 is a perspective drawing of the AM modulating device 55 showing that the sides 33' and 35' are parallel to the active axis 37 while the surface 39 is orthogonal to this axis. Another side 57 is shown at an angle of $2\theta_r$ (to be described later) with respect to the active axis and has an intersecting surface 59 perpendicular to it. Surfaces 39, 41 and 59 may preferably be polished optically flat and the surface 39 may also be coated with either an antireflection coating 45 or reflection coating 43, as discussed in the cases for FIGS. 2 and 3. Surface 59 is coated with an antireflection coating 58 to allow an AM modulated laser beam to leave the laser's cavity when reflected by the Brewster window 41 as seen by the output line indicated here as reference numeral 60.

Again referring to FIGS. 1 and 4, the electrode plates 27 and 29 used for both the AM and FM modulating devices 51 and 21 are in the shape of the FM modulating device 21.

In order to design these devices for a specific electro-optic material, it is necessary to know the material's index of refraction. For example, the internally modulating devices 21 and 51 shown in FIGS. 1 and 4, respectively, are fabricated from an electro-optic material whose index of refraction, $n$, is different than that of the material used to fabricate the devices 31 and 55 shown in FIGS. 2, 3 and 5. From $n$, the index of refraction, all angles used in constructing the devices may be calculated:

$$\theta_p = \tan^{-1} n$$
$$\theta_r = 90° - \theta_p$$
$$\theta_c = 2\theta_p - 90°.$$

These equations are derived by using simple geometry along with Brewster's law and Snell's law as shown below:

$$n = \tan \theta_p = (\sin \theta_p / \cos \theta_p)$$
$$\sin \theta_r / \sin \theta_t = n/1$$
$$\theta_t = \theta_p$$

Figure 6A:
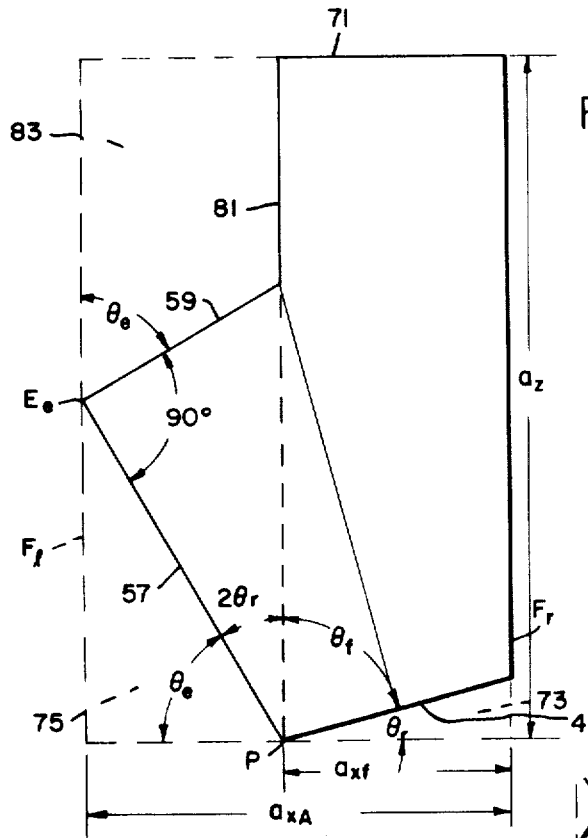
FIG. 6A is a schematic plan view representation for constructing the internal modulators used in the various embodiments of the invention.
Figure 7:
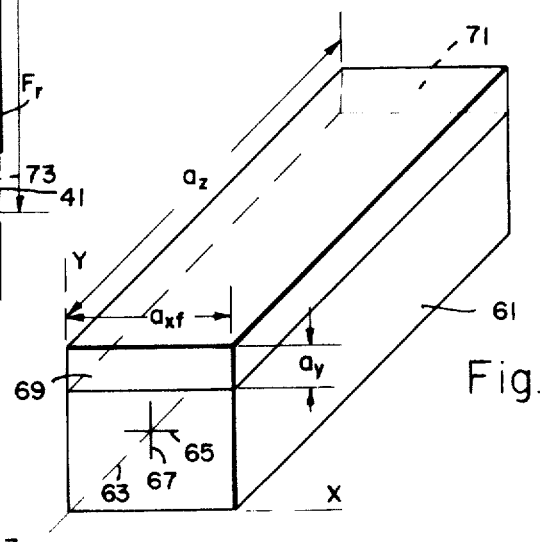
FIG. 7 is a schematic representation for orienting the crystal about the active axis in order to make the frequency modulating device.
Figure 8:
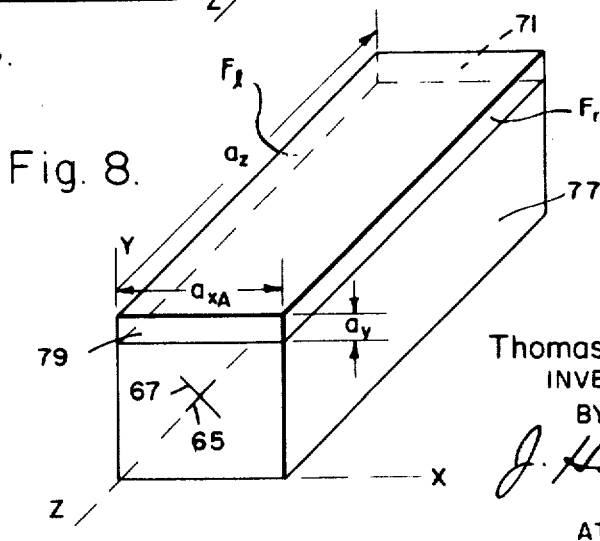
FIG. 8 is a schematic representation for orienting the crystal about the active axis in order to make the amplitude modulating device.

$\theta_r = 90° - \theta_p$. FIG. 6A is a plan view for constructing both the FM and AM devices 31 and 55 from rectangular bars whose dimensions and orientation about the active axis of the material are shown in FIGS. 7 and 8. Because the electric field is applied in a direction orthogonal to the active axis and because the Brewster window 41 is oriented to provide a laser beam propagating within the modulating device with a direction of preferred polarization orthogonal to the direction of the electric field, the direction of preferred polarization of the laser beam propagating along the active axis, the direction of the active axis, and the direction of the electric field are all mutually perpendicular. For the embodiments shown in FIGS. 7 and 8, the electric field is considered to be applied in the $y$ direction while the active axis is considered to be the $z$ axis and the direction of preferred polarization is along the $x$ axis.

Figure 6B:
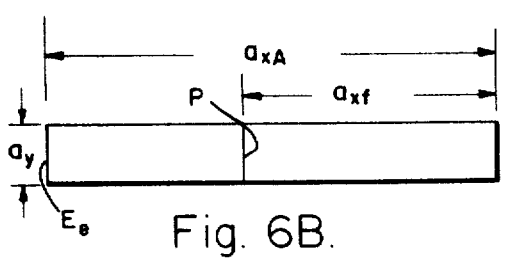
FIG. 6B is an elevational view of the device shown in FIG. 6A.

With reference to FIG. 7, the electro-optic crystal is cut into a rectangular block 61 so that its active axis 63 lies along the $z$ axis of the block and its induced fast axis 65 and slow axis 67 of refraction lie along the $x$ and $y$ axes or the $y$ and $x$ axes, respectively. A rectangular bar 69 may then be cut from the original block 61 parallel to the $x$ axis with the ratio of the dimension $a_{xf}$ to the dimension of $a_y$ of this bar being determined by the equation $a_{xf}/a_y = 1 \cos \theta_p$. The dimension $a_z$ of this bar is long enough to allow sufficient modulation of the laser beam or, in other words, it is determined by the desired modulation depth and available voltage. Once the rectangular bar is aligned and cut according to the above, an FM device 31 may then be made according to FIGS. 6A and 6B. An end face 71 of the rectangular bar 69, orthogonal to its active axis, is ground and polished optically flat and is then coated with either a reflection or antireflection substance. If an antireflection substance is used, then an additional reflecting surface such as a planar or spherical mirror shown in FIGS. 1 and 3 is required. Of course, if a reflection substance is used, then no additional reflecting surface is required.

A Brewster window 41 is then provided by removing a right triangular prism 73, which has a vertex, at an angle $\theta_r$, located along an imaginary line P which, for the FM device, is conceptually drawn on an uncoated end face orthogonal to the active axis and on an edge perpendicular to the $x$ axis and which has a thickness of $a_y$ and a leg adjacent to angle $\theta_r$ parallel to the $x$ axis with length $a_{xf}$. The Brewster window 41 is then ground and polished and the device 31, as seen in FIG. 2 or 3, is provided.

With reference to FIG. 8, the electro-optic crystal is cut into a rectangular block 77 similar to block 61 as in FIG. 7, except that here the induced fast axis 65 and slow axis 67 of refraction are 45° out of alignment with the x and y axes. Now, a rectangular bar 79 is then cut from the original block 77 parallel to the x axis with the ratio of the dimension $a_{xA}$ to the dimension $a_y$ of this bar being determined by the equation $a_{xA}/a_y = a_{xf}(1 + \cos 2\theta_r)$. As in the FM case, the dimension $a_x$ of the bar 79 is long enough to allow sufficient modulation of the laser beam.

Once the bar 79 is aligned and cut according to the above, an AM device 55 is then made according to FIG. 6A. A face 71 of the rectangular bar orthogonal to its active axis is ground and polished optically flat and is then coated with either a reflection or antireflection coating as discussed for the FM device 31 in FIGS. 2 and 3.

An imaginary line P is drawn conceptually on an uncoated end face orthogonal to the active axes, always at a distance of $a_{xf}$ from a side face $F_r$ perpendicular to the x axis and always at a distance of $a_{xA} - a_{xf}$ from a side face $F_l$ perpendicular to the x axis.

A right triangular prism 73, which has a vertex at an angle $\theta_r$ being located along the imaginary line P and having a thickness $a_y$ and a leg adjacent to angle $\theta_r$ parallel to the x axis with length $a_{xf}$ and another leg being along the side face $F_r$, is removed to provide a surface 41. The surface 41 is then ground and polished optically flat to provide a Brewster window.

Another right triangular prism 75, which has a vertex at angle of $\theta_c$ being located also along the imaginary line P and having a thickness $a_y$, a leg adjacent to angle $\theta_c$ parallel to the x axis with length $a_{xA} - a_{xf}$ and another leg being a portion of the side face $F_l$, are removed to provide a surface 57.

An edge $E_e$ of the bar 79 is perpendicular to the x axis at the intersection of surface 57 and the side face $F_l$. A surface 81 is then fabricated parallel to the active axis, and a surface 59 is made perpendicular to the surface 57 and extends from the edge $E_e$ a distance of $a_{xf}$ to where the surface 59 intersects with the surface 81. These surfaces are provided by removing a right trapezoidal prism 83 having a vertex of its interior angle $\theta_r$ located along the edge $E_e$. This prism will have a thickness of $a_y$ and a nonparallel side 59, adjacent to the interior angle $\theta_e$, will have a length $a_{xf}$ and its parallel sides 81 and a portion of the side face $F_l$ will extend to the end face 71 which is perpendicular to these sides. The surface 59 is ground and polished optically flat; it is then coated with an antireflection to allow an amplitude modulated laser beam, as reflected from the inner face of the Brewster window 41, to leave the crystal.

From the foregoing, it can be seen that there has been described internal modulation of a laser by AM and FM modulators whose insertion losses are small enough to allow them to be used in low-gain lasers. Further, there have been described techniques for fabricating these internal modulators. Additionally, it has been noted that these internal modulators simplify the alignment problems and that they also may be used in high-gain lasers to increase efficiency.

Although specific embodiments have been herein described, it will be appreciated that other organizations of the specific arrangement shown may be made within the spirit and scope of the invention. For example, the active laser material may be any material exhibiting laser action, and the spacing of the various elements of the internally modulated lasers in FIGS. 1 and 4 may be other than that shown. Furthermore, it should be noted that the sketches in various figures are not drawn to scale and that the thicknesses and distances of and between various figures are not to be considered significant. As set forth previously, other components similar in function may be substituted for the components shown in the drawings.

Accordingly, it is intended that the foregoing disclosure and the showings made in the drawings shall be considered only as illustrations of the principles of this invention and are not to be construed in a limiting sense.

What I claim is:

1. An internally modulated laser for modulating a laser beam in accordance with a modulating signal, comprising:
    laser regenerative means including reflective elements at both ends thereof for defining between said reflective elements a laser regenerative path;
    an active laser element disposed in said laser regenerative path;
    means coupled to said active laser element for exciting said laser element to a lasing state and generating a laser beam along said laser regenerative path;
    an internal modulator of electro-optic material disposed in said laser regenerative path, said material having an active axis therein such that an electric field applied across said material in a predetermined direction will induce a change in the index of refraction for optical energy of a particular polarization propagating through said material substantially parallel to said active axis and such that the applied electric field will induce an equal and opposite change in the index of refraction for optical energy polarized orthogonally to said particular polarization, said material also having a flat surface upon which said laser beam is incident at the Brewster angle and is disposed with relation to said active axis such that said laser beam propagates along said regenerative path through said material substantially parallel to said active axis with a direction of polarization at an angle of 45° with respect to the direction of said particular polarization;
    modulating means including electrodes coupled to said material for creating said applied electric field and modulating said laser beam when a modulating signal is coupled thereto; and
    output means including said flat surface for internally reflecting said modulated laser beam as an output beam out of said regenerative path and said material.

2. An internally modulated laser according to claim 1, wherein said electro-optic material includes an output surface having an antireflection coating, said output surface being oriented orthogonally with respect to said output beam.

3. An internally modulated laser according to claim 2, wherein one of said reflective elements s an optically flat reflector spaced from said electro-optical material whose end surface is coated with an antireflection substance.

4. An internally modulated laser according to claim 2, wherein one of said reflective elements is a spherical reflector spaced from said electro-optical material whose end surface is coated with an antireflection substance.

5. An internally modulated laser according to claim 2, wherein one of said reflective elements is disposed on the end surface of said electro-optical material.